United States Patent
Yamashita et al.

(12)

(10) Patent No.: US 11,242,440 B2
(45) Date of Patent: Feb. 8, 2022

(54) POLYOLEFIN MICROPOROUS MEMBRANE AND PRODUCTION METHOD THEREOF

(71) Applicant: Asahi Kasei Kabushiki Kaisha, Tokyo (JP)

(72) Inventors: Akihisa Yamashita, Tokyo (JP); Masaki Katayama, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 34 days.

(21) Appl. No.: 16/498,076

(22) PCT Filed: Jan. 31, 2018

(86) PCT No.: PCT/JP2018/003272
§ 371 (c)(1),
(2) Date: Sep. 26, 2019

(87) PCT Pub. No.: WO2018/179810
PCT Pub. Date: Oct. 4, 2018

(65) Prior Publication Data
US 2020/0024419 A1    Jan. 23, 2020

(30) Foreign Application Priority Data

Mar. 27, 2017   (JP) .............................. JP2017-060465

(51) Int. Cl.
| | | |
|---|---|---|
| *C08J 9/28* | (2006.01) | |
| *H01M 10/0525* | (2010.01) | |
| *H01M 50/403* | (2021.01) | |
| *H01M 50/411* | (2021.01) | |

(52) U.S. Cl.
CPC ........... *C08J 9/28* (2013.01); *H01M 10/0525* (2013.01); *H01M 50/403* (2021.01); *H01M 50/411* (2021.01); *C08J 2205/044* (2013.01); *C08J 2205/052* (2013.01); *C08J 2207/00* (2013.01); *C08J 2323/06* (2013.01)

(58) Field of Classification Search
CPC .. C08J 9/28; C08J 2205/044; C08J 2205/052; C08J 2207/00; C08J 2323/06; C08J 5/22; C08J 9/26; C08J 5/18; H01M 50/403; H01M 50/411; H01M 10/0525; H01M 50/409; Y02E 60/10; C08F 110/02; C08F 210/02; B29C 55/02; B29C 48/08
See application file for complete search history.

(56) References Cited

U.S. PATENT DOCUMENTS

| | | |
|---|---|---|
| 2005/0019665 A1 | 1/2005 | Adachi et al. |
| 2009/0146334 A1 | 6/2009 | Takita et al. |
| 2009/0148685 A1 | 6/2009 | Kang et al. |
| 2009/0186280 A1 | 7/2009 | Iidani et al. |
| 2010/0021822 A1 | 1/2010 | Ikemoto et al. |
| 2011/0027660 A1 | 2/2011 | Takeda et al. |
| 2011/0311878 A1* | 12/2011 | Inagaki ............ H01M 10/0525 429/246 |
| 2012/0070644 A1 | 3/2012 | Kang et al. |
| 2015/0372276 A1 | 12/2015 | Mizuno et al. |

FOREIGN PATENT DOCUMENTS

| | | |
|---|---|---|
| CN | 101155862 A | 4/2008 |
| CN | 101331178 A | 12/2008 |
| CN | 101616968 A | 12/2009 |
| EP | 3098256 A1 | 11/2016 |
| EP | 3181621 A1 | 6/2017 |
| JP | 2002-128942 A | 5/2002 |
| JP | 2006-124652 A | 5/2006 |
| JP | 2009-132904 A | 6/2009 |
| JP | 2010-007053 | 1/2010 |
| JP | 2011-233542 A | 11/2011 |
| JP | 2012-522669 A | 9/2012 |
| JP | 2013-535792 A | 9/2013 |
| JP | 2017-027945 A | 2/2017 |
| WO | 2004/020511 A1 | 3/2004 |
| WO | 2009/123015 A1 | 10/2009 |
| WO | 2010/070930 A1 | 6/2010 |
| WO | 2012/018675 A1 | 2/2012 |
| WO | 2014/126079 A1 | 8/2014 |

OTHER PUBLICATIONS

International Search Report issued in corresponding International Patent Application No. PCT/JP2018/003272 dated Apr. 24, 2018.
International Preliminary Report on Patentability and Written Opinion issued in corresponding International Patent Application No. PCT/JP2018/003272 dated Oct. 10, 2019.
Supplementary European Search Report in the European Patent Application No. 18774533.6 dated Mar. 17, 2020.

\* cited by examiner

*Primary Examiner* — Kara B Boyle
(74) *Attorney, Agent, or Firm* — Morgan, Lewis & Bockius LLP

(57) ABSTRACT

This polyolefin microporous membrane has a TD thermal shrinkage at 120° C. of 8% or less, and the TD thermal shrinkage at 130° C. thereof is 3 to 5 times greater than the TD thermal shrinkage at 120° C. and at least 12% greater than the TD thermal shrinkage at 120° C.

10 Claims, 2 Drawing Sheets

(A)

(B)

(C)

great as the TD thermal shrinkage at 120° C. and of at least 12% greater than the TD thermal shrinkage at 120° C.
POLYOLEFIN MICROPOROUS MEMBRANE AND PRODUCTION METHOD THEREOF

FIELD

The present invention relates to a polyolefin microporous membrane, a production method thereof, and a separator for a secondary battery.

BACKGROUND

Since microporous membranes exhibit excellent electric resistance or ion permeability, these are widely used as separators for batteries, separators for condensers, materials for fuel cells, microfiltration membranes, etc., and particularly as separators for lithium ion secondary batteries.

In recent years, lithium ion secondary batteries have been used for applications of miniature electronic devices such as cellular phones and laptop computers, etc., and also applied to electric vehicles including electric cars or small electric motorcycles, etc. As for a separator for lithium ion secondary batteries, not only mechanical characteristics and ion permeability, but also the property (shutdown property) of clogging micropores of the separator by thermal melting, etc., in response to the heat of the secondary battery to suppress ion permeability inside an electrolytic solution and terminate an electrochemical reaction, but also the property (meltdown property) of discharging the battery by melt rupture of membrane before reaching an abnormally elevated temperature while retaining energy, is required. In general, the shutdown temperature corresponds to the lowest temperatures at which the separator shuts down, and the meltdown temperature exceeds the shutdown temperature.

In relation to the required characteristics of the separator, raw materials, porosity, tensile strength, tensile elongation, manufacturing conditions, etc., of a polyolefin microporous membrane, have been investigated (Patent Documents 1 and 2).

In Patent Document 1, there has been proposed a polyolefin microporous membrane containing as essential components polyethylene (PE) having a viscosity-average molecular weight (Mv) of 100,000 or more and less than 400,000 or a copolymer thereof and PE having Mv of 400,000 or more and 10,000,000 or less or a copolymer thereof in order to provide a separator that hardly deforms and is excellent in rupture resistance and stress relaxation characteristics without impairing the conventional physical properties. In Patent Document 1 the tensile strength and tensile elongation of the polyolefin microporous membrane as well as the ratio of the extrusion rate of the polyolefin composition to the screw rotation number (Q/N) is also investigated.

Patent Document 2 proposes a polyolefin microporous membrane composed of a polyolefin composition containing as essential components, polyolefin having a weight-average molecular weight (Mw) of $5\times10^5$ or more and polyolefin having Mw of $1\times10^4$ or more and less than $5\times10^5$ produced using a Ziegler-Natta catalyst in order to balance air permeability, porosity, fine pore diameter, compressibility, mechanical strength, dimensional stability, shutdown characteristics and meltdown characteristics of the separator.

PATENT DOCUMENTS

[Patent Document 1] Japanese Unexamined Patent Publication (Kokai) No. 2006-124652
[Patent Document 2] Japanese Unexamined Patent Publication (Kokai) No. 2002-128942

DISCLOSURE OF THE INVENTION

Problems to be Solved by the Invention

Along with the recent increase in capacity and energy density of lithium ion secondary batteries, it has been required for separators to ensure safety in an environment that is assumed to be more severe than before.

However, even though the conventional polyolefin microporous membranes as described in Patent Documents 1 and 2 have high membrane strength, in the secondary batteries using these, there is a likelihood of strain of the secondary battery due to impact such as falling directly leading to strain of the membrane, which gives rise to membrane rupture and short circuit. Therefore, the conventional secondary battery requires a mechanism for reducing the strain of the separator in the secondary battery.

Furthermore, although the behavior of the separator with respect to the external temperature is also important, when the separator is used for automotive onboard applications, the insulating property cannot be secured unless the dimension is stable even at external temperatures within a range of 100° C. to about 120° C. and the micropores are clogged immediately in the vicinity of the melting temperature of the separator.

Thus, it has been required for the polyolefin microporous membrane not only simply to have low heat shrinkage, but also to shrink rapidly near the melting point, exhibiting favorable shutdown performance. In particular, from the viewpoint of preventing the thermal runaway of the battery at an early stage, it is preferable to have the micropores of the membrane clogged in the vicinity of 130° C.

In view of the above circumstances, the problem to be solved by the present invention is to provide a polyolefin microporous membrane having dimensional stability for an external stress or temperatures within a range of 100° C. to about 120° C. and bringing about rapid pore-clogging at 130° C., which is capable of preventing thermal runaway of a battery at an early stage, and to provide a separator for a secondary battery using the polyolefin microporous membrane.

Means for Solving the Problem

The present inventors have found that the problem can be solved by specifying heat shrinkage properties of a polyolefin microporous membrane, or specifying manufacture conditions of the polyolefin microporous membrane, and thus have completed the present invention.

Namely, the present invention is as described below.
[1] A polyolefin microporous membrane, having a TD thermal shrinkage at 120° C. of 8% or less, and a TD thermal shrinkage at 130° C. of 3 to 5 times as great as the TD thermal shrinkage at 120° C. and of at least 12% greater than the TD thermal shrinkage at 120° C.
[2] The polyolefin microporous membrane according to [1], wherein a coefficient of dynamic friction of the membrane is 0.10 or more and 0.35 or less.
[3] The polyolefin microporous membrane according to [1] or [2], comprising 15% or more of molecules having a molecular weight of 50,000 or less and 15% or more of molecules having a molecular weight of 500,000 or more in gel permeation chromatography (GPC) measurement.

[4] The polyolefin microporous membrane according to any one of [1] to [3], wherein a meltdown temperature of the membrane is 150° C. or higher and 200° C. or lower.

[5] The polyolefin microporous membrane according to any one of [1] to [4], wherein a ratio (MD/TD thermal shrinkage ratio) of a MD thermal shrinkage of the membrane to the TD thermal shrinkage is greater than 1.0 at 120° C. and less than 1.0 at 130° C.

[6] The polyolefin microporous membrane according to [5], wherein a ratio (MD/TD elastic modulus ratio) of a MD elastic modulus of the membrane to a TD elastic modulus of the membrane is 1.7 or more and 3.0 or less.

[7] A method for manufacturing a polyolefin microporous membrane, comprising the steps of:

(A) synthesizing a polyethylene or ethylene constitutional unit-containing copolymer using a monomer and a Ziegler-Natta catalyst to obtain a polyethylene raw material.

(B) molding a polyolefin composition containing the polyethylene raw material into a sheet and stretching the sheet; and (C) subjecting the sheet to extraction and heat-setting to form a polyolefin microporous membrane having a TD thermal shrinkage at 120° C. of 8% or less, and a TD thermal shrinkage at 130° C. of 3 to 5 times as great as the TD thermal shrinkage at 120° C. and of at least 12% greater than the TD thermal shrinkage at 120° C.

[8] The method for manufacturing the polyolefin microporous membrane according to [7], wherein in step (B), a ratio of an extrusion rate Q of the polyolefin composition to a number of screw rotation N of an extruder (Q/N) is 2.0 or more and 7.0 or less.

[9] The method for manufacturing the polyolefin microporous membrane according to [7] or [8], wherein, in simultaneous biaxial or sequential biaxial stretching in step (B), a ratio (MD/TD strain rate ratio) of a MD strain rate to a TD strain rate is 1.2 or more and 1.8 or less.

[10] The method for manufacturing the polyolefin microporous membrane according to any one of [7] to [9], wherein in the heat-setting of step (C), TD stretching and TD relaxation are each included once, a strain rate in the stretching step is 20%/second or more, and a relaxation rate is 10%/second or less.

Effects of the Invention

The present invention enables to provide a polyolefin microporous membrane having dimensional stability for an external stress or temperatures less than a melting temperature and exhibiting rapid pore-clogging property or shutdown performance in the vicinity of the melting temperature.

Moreover, according to the present invention, separator shrinkage can be suppressed up to the external temperatures in the vicinity of 120° C. and the separator enables to promptly shut down at more elevated external temperatures, thereby capable of improving safety of a secondary battery.

MODE FOR CARRYING OUT THE INVENTION

Figure 1:
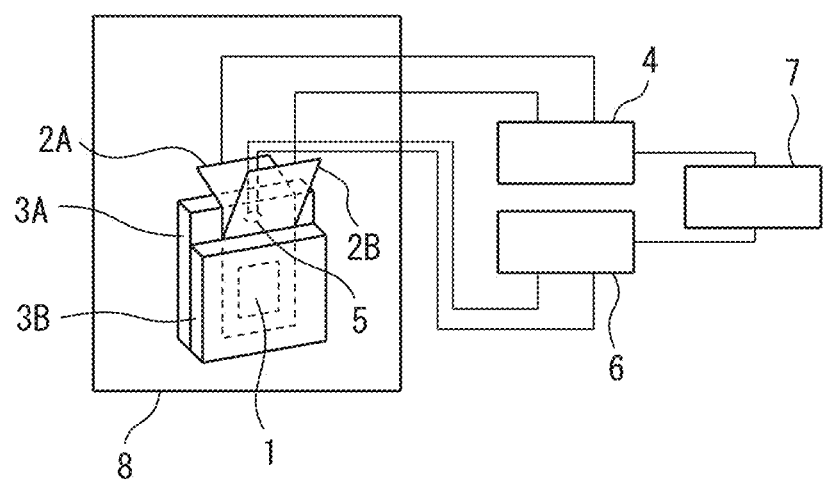
FIG. 1 is a schematic diagram illustrating meltdown temperature measurement.
Figure 1:
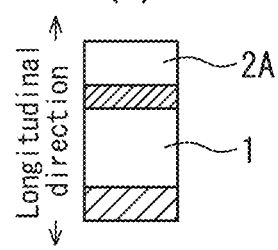
Figure 1:
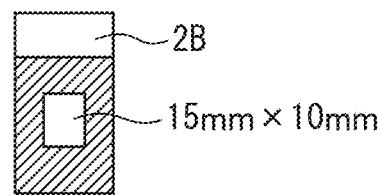

Embodiments for carrying out the invention (hereunder referred to as "the present embodiment") will now be explained in detail. It is to be understood, however, that the invention is not limited to these embodiments, and may implement various modifications within the scope of the gist thereof <Microporous Membrane>

One aspect of the present invention is a polyolefin microporous membrane. The microporous polyolefin membrane preferably has low electron conductivity, ion conductivity, high resistance to organic solvents, and a microscopic pore diameter. Moreover, the polyolefin microporous membrane can be utilized as a separator for a secondary battery.

The polyolefin microporous membrane according to the first embodiment has a TD heat shrinkage (heat shrinkage in TD) at 120° C. of 8.0% or less, and a TD heat shrinkage at 130° C. of the membrane is 3 to 5 times greater than the TD heat shrinkage at 120° C. and at least 12.0% greater than the TD heat shrinkage at 120° C.

In the present specification, the abbreviation "MD" means a machine direction of continuous microporous membrane processing, and the abbreviation "TD" means a direction crossing the MD at an angle of 90°.

While it is not our desire to be constrained by theory, it is conjectured that when the TD heat shrinkage of the polyolefin microporous membrane at 120° C. is within the range of 8.0% or less, the polyolefin microporous membrane has dimensional stability even though the external temperature or the internal temperature of the secondary battery becomes elevated temperatures in the range of 100° C. to 120° C. From the same point of view, the TD heat shrinkage at 120° C. is preferably within the range of 3.0% to 7.5%, more preferably 3.5% to 7.0%, and still more preferably 4.0% to 6.0%.

When the TD heat shrinkage of the polyolefin microporous membrane at 130° C. is within the range of 3 times or more and 5 times or less greater than the TD heat shrinkage at 120° C., the polyolefin microporous membrane tends to have favorable heat resistance and favorable shutdown characteristics. If the TD heat shrinkage at 130° C. is within a range of 5 times or less greater than the TD heat shrinkage at 120° C., excessive shrinkage can be suppressed when the temperature of the battery rises up to 130° C. From the same viewpoint, the TD heat shrinkage at 130° C. is preferably 3.1 times or more and 5.0 times or less as great as the TD heat shrinkage at 120° C., more preferably 3.3 times or more and 5.0 times or less, still more preferably 3.5 times or more and 4.5 times or less, and particularly preferably 3.7 times or more and 4.3 times or less, as great as the TD heat shrinkage at 120° C.

The polyolefin microporous membrane having the TD heat shrinkage at 130° C. that is at least 12.0% greater than the TD heat shrinkage at 120° C. tends to instantaneously clog pores to shut down, when heated at a temperature, for example, exceeding the melting point of the polyolefin resin. The melting point means a temperature at which the polyolefin resin or the microporous membrane melts, and can be read from, for example, the temperature at which the maximum point is observed in temperature measurement by a differential scanning calorimeter. From the viewpoint of shutdown characteristics, the value (%) obtained by subtracting the TD heat shrinkage (%) at 120° C. from the TD heat shrinkage (%) at 130° C. is in the range of preferably more than 12% and 32% or less, more preferably 13.0% or more and 31.0% or less, and still more preferably 14.0% or more and 20.0% or less. Since the edge of the separator in the TD perpendicular to a battery winding direction is not constrained and easily influenced by the heat shrinking behavior of the separator, the TD heat shrinkage (%) being held within the above range, enables to suppress shrinkage at external temperatures in the range of 100° C. to 120° C., and allows the separator to shut down promptly in the vicinity of 130° C.

The TD heat shrinkages at 120° C. and 130° C. can be adjusted in the same manner as described above by, for example, selection of a catalyst in the course of synthesis of the polyolefin raw material, control of strain rate upon extrusion and stretching of the polyolefin composition, control of relaxation rate when heat setting the microporous membrane, etc.

The polyolefin microporous membrane according to the second embodiment has a coefficient of dynamic friction of 0.10 or more and 0.35 or less. While it is not our desire to be constrained by theory, it is conjectured that when the coefficient of dynamic friction of the polyolefin microporous membrane is 0.10 or more, transportation of the web when fabricating a secondary battery can be facilitated because the grip of the transport roll with the polyolefin microporous membrane is increased. While not wishing to be bound by theory, it is surmised that under the condition of the coefficient of dynamic friction of 0.35 or less, when applying an impact to a secondary battery containing a polyolefin microporous membrane as a separator, the separator slips slightly or is slipped intentionally between a plurality of electrodes, thereby reducing strain of the separator itself to be able to improve impact resistance of the secondary battery. From such a viewpoint, the coefficient of dynamic friction is preferably 0.13 or more and 0.30 or less, and more preferably 0.15 or more and 0.25 or less.

The coefficient of dynamic friction of the polyolefin microporous membrane can be adjusted within the range of 0.10 or more and 0.35 or less, for example, by selection of the catalyst used when synthesizing the polyolefin raw material.

In the polyolefin microporous membrane according to the third embodiment, a ratio (MD/TD heat shrinkage ratio) of the MD heat shrinkage to the TD heat shrinkage exceeds 1.0 at 120° C., and is less than 1.0 at 130° C.

When the battery temperature rises, the edge shrinks in the unrestrained TD in the vicinity of 130° C., which promptly leads to pore-clogging and shutdown, but the structure of the polyolefin microporous membrane that does not excessively shrink in the range of 100° C. to 120° C. is specified by the MD/TD heat shrinkage ratio of greater than 1.0 at 120° C. and less than 1.0 at 130° C. The MD/TD heat shrinkage ratio is preferably more than 1.05 at 120° C. and less than 0.95 at 130° C., and more preferably more than 1.10 at 120° C. and less than 0.90 at 130° C.

The MD/TD heat shrinkage ratio can be adjusted in the same manner as described above, for example, by appropriately controlling the MD/TD strain rate ratio upon extrusion and stretching of the polyolefin composition.

The polyolefin microporous membrane according to the fourth embodiment has an arbitrary combination of the heat shrinkage and the coefficient of dynamic friction of the polyolefin microporous membrane described above.

The components and preferred embodiments of the polyolefin microporous membrane according to the fourth embodiment are described below.

[Components]

As the polyolefin microporous membrane, examples thereof include a porous membrane containing a polyolefin resin, porous membranes containing resins such as polyethylene terephthalate, polycycloolefin, polyether sulfone, polyamide, polyimide, polyimideamide, polyaramid, polycycloolefin, nylon, polytetrafluoroethylene, etc., woven fabrics (woven cloth) of polyolefin-based fibers, nonwoven fabrics of polyolefin-based fibers, paper, and aggregates of insulating material particles. Among these, from the standpoint of imparting excellent coatability to a coating liquid and rendering a separator thickness thinner than that of a conventional separator when obtaining a multilayer porous membrane i.e., a separator for a secondary battery via the coating step, to enhance an active material ratio in an electric storage device such as the secondary battery, etc., and increase a capacity per volume, a porous membrane containing a polyolefin resin (hereinafter also referred to as "polyolefin resin porous membrane") is preferable.

A polyolefin resin porous membrane will be described below.

The polyolefin resin porous membrane is preferably a porous membrane formed by the polyolefin resin composition in which the polyolefin resin occupies 50% by weight or more and 100% by weight or less of the resin component constituting the porous membrane, from the viewpoint of improving the shutdown performance etc., when used as a secondary battery separator. The proportion of the polyolefin resin occupying in the polyolefin resin composition is more preferably 60% by weight or more and 100% by weight or less and still more preferably 70% by weight or more and 100% by weight or less.

The polyolefin resin comprised in the polyolefin resin composition is not particularly limited, and for example, homopolymers, copolymers, or multistage polymers, etc., that are obtained using as monomers ethylene, propylene, 1-butene, 4-methyl-1-pentene, 1-hexene, and 1-octene, etc., are included. These polyolefin resins may be used alone or in combination of two or more.

Among these, from the viewpoint of the shutdown characteristics when the polyolefin resin porous membrane is used as a separator for a secondary battery, as the polyolefin resin, polyethylene, polypropylene, copolymers thereof, and mixtures thereof are preferable.

Specific examples of polyethylene include low density polyethylene, linear low density polyethylene, medium density polyethylene, high density polyethylene, ultrahigh molecular weight polyethylene, etc.

Specific examples of polypropylene include isotactic polypropylene, syndiotactic polypropylene, atactic polypropylene, etc.

Specific examples of the copolymer include ethylene-propylene random copolymer, ethylene-propylene rubber, etc.

Moreover, from the viewpoint of terminating the thermal runaway of a battery at an early stage, the polyolefin resin is preferably polyethylene having a melting point within the range of 130° C. to 140° C. The proportion of polyethylene in the polyolefin resin is preferably 70% by weight or more, more preferably 80% by weight or more, and still more preferably 90% by weight or more.

Among these, from the viewpoint of satisfying the required performance of low melting point and high strength when the polyolefin resin porous membrane is used as a separator for a secondary battery, polyethylene, particularly high density polyethylene is preferably used as the polyolefin resin. Furthermore, from the viewpoint of exhibiting rapid fuse behavior, it is preferable that the main component of the polyolefin resin porous membrane is polyethylene. It is noted that in the present invention, high density polyethylene is referred to as polyethylene having a density of 0.942 to 0.970 g/cm$^3$ and the density of polyethylene denotes a value measured according to D) density gradient tube method described in JIS K7112 (1999).

From the viewpoint of impact resistance, the proportion of high density polyethylene synthesized by a Ziegler-Natta catalyst is preferably 70% by weight or more, more preferably 90% by weight or more, and further preferably 100% by weight. Since the molecular chains of polyethylene synthesized by the Ziegler-Natta catalyst have appropriate linearity and do not have bulky side chains, the coefficient of dynamic friction of the resulting microporous membrane is small. Therefore, when an impact is applied to a secondary battery containing a polyolefin microporous membrane as a separator, the separator slips slightly or is slipped intentionally between a plurality of electrodes, thereby capable of reducing strain of the separator itself and not resulting in rupture of membrane.

From the viewpoint of improving the heat resistance of the porous membrane, a mixture of polyethylene and polypropylene may be also used as the polyolefin resin. In this case, the proportion of polypropylene to the total polyolefin resin in the polyolefin resin composition is preferably 1 to 35% by weight, more preferably 3 to 20% by weight, and still more preferably 4 to 10% by weight from the viewpoint of achieving both heat resistance and favorable shutdown function.

The polyolefin resin composition may contain arbitrary additives. As an additive, examples thereof include polymers other than the polyolefin resin; inorganic fillers; antioxidants such as phenol-based, phosphorus-based, sulfur-based antioxidant, etc.; metal soaps such as calcium stearate, zinc stearate, etc.; ultraviolet light absorbers; light stabilizers; antistatic agents; antifogging agents; color pigments, etc. The total addition amount of these additives is preferably 20 parts by weight or less with respect to 100 parts by weight of the polyolefin resin from the viewpoint of improving the shutdown performance, etc., it is more preferably 10 parts by weight or less, and still more preferably 5 parts by weight or less.

[Details of Microporous Membrane]

The polyolefin microporous membrane has a porous structure in which a large number of extremely fine pores is gathered to form dense percolated pores, so that it has features of excellent ion conductivity, favorable voltage resistance characteristics, and also high strength.

Moreover, one or more different functional layers may be formed on one or both surfaces of the aforementioned polyolefin microporous membrane. Examples of the functional layer include a heat-resistant layer containing a heat-resistant resin such as inorganic particles or a crosslinkable polymer, etc., and an adhesive layer containing an adhesive polymer, etc.

As a lamination method, a method for coating a functional layer on a polyolefin microporous membrane using a gravure coater or a die coater, or a lamination method by coextrusion, etc., is included.

The thickness of the microporous membrane is preferably 0.1 µm or more and 100 µm or less, more preferably 1 µm or more and 50 µm or less, and still more preferably 3 µm or more and 25 µm or less. The membrane thickness of the microporous membrane is preferably 0.1 µm or more from the viewpoint of mechanical strength and is preferably 100 µm or less from the viewpoint of increasing the capacity of the secondary battery. The membrane thickness of the microporous membrane can be adjusted by controlling the die lip gap, the stretching ratio in the stretching step, etc.

The average pore diameter of the microporous membrane is preferably 0.03 µm or more and 0.70 µm or less, more preferably 0.04 µm or more and 0.20 µm or less, still more preferably 0.05 µm or more and 0.10 µm or less, and furthermore preferably 0.06 µm or more and 0.09 µm or less. From the viewpoint of high ion conductivity and voltage resistance, the average pore diameter of the microporous membrane is preferably 0.03 µm or more and 0.70 µm or less. The average pore diameter of the microporous membrane can be measured, for example, by the measurement method described in Japanese Unexamined Patent Publication No. 2017-27945.

The average pore diameter is adjusted by controlling the composition ratio, cooling rate of an extruded sheet, stretching temperature, stretching ratio, heat setting temperature, stretching ratio upon heat setting, relaxation ratio upon heat setting, or by combining these.

The porosity of the microporous membrane is preferably 25% or more and 95% or less, more preferably 30% or more and 65% or less, and still more preferably 35% or more and 55% or less. The porosity is preferably 25% or more from the viewpoint of improving ion conductivity and is preferably 95% or less from the viewpoint of voltage resistance characteristics.

The porosity of the microporous membrane can be adjusted by controlling the mixing ratio of the polyolefin resin composition and the plasticizer, stretching temperature, stretching ratio, heat setting temperature, stretching ratio upon heat setting, relaxation ratio upon heat setting, or by combining these.

The meltdown temperature of the microporous membrane is preferably 150° C. or higher and 200° C. or lower, more preferably 160° C. or higher and 190° C. or lower, and further preferably 170° C. or higher and 180° C. or lower. The meltdown temperature of 150° C. or higher means that the rupture of the microporous membrane does not occur up to 150° C., and thereby the safety of the secondary battery can be ensured. Moreover, the meltdown temperature of higher than 150° C. and 200° C. or lower means that the secondary battery is gradually discharged even if the rupture of the microporous film occurs, and thereby the security is secured such that the secondary battery does not have an excessively high energy. The meltdown temperature can be adjusted within the range of 150° C. or higher and 200° C. or lower depending on the molecular weight of the polyolefin and the stretching and heat setting conditions.

When the microporous membrane is a polyolefin resin porous membrane, the viscosity-average molecular weight (Mv) of the polyolefin resin used as the raw material is preferably 30,000 or more and 12,000,000 or less, more preferably 50,000 or more and less than 5,000,000, and still more preferably 100,000 or more and less than 2,000,000. When the viscosity-average molecular weight is 30,000 or more, the moldability upon melt-molding is improved, and high strength tends to be achieved due to entanglements between polymers, which is preferable. On the other hand, when the viscosity-average molecular weight is 12,000,000 or less, uniform melt-kneading is facilitated, which is preferable because of a likelihood of excellent sheet formability, particularly thickness stability. Furthermore, when the polyolefin resin porous membrane is used as a separator for a secondary battery and the viscosity-average molecular weight thereof is less than 1,000,000, the pores are prone to clog when a temperature rises, which is preferable because favorable shutdown function tends to be obtainable.

From the viewpoint of physical properties or raw material characteristics of the polyolefin resin porous membrane, the polyolefin resin porous membrane preferably has a ratio (dispersity: Mw/Mn) of a weight-average molecular weight to a number-average molecular weight of 3.0 or more and 10.0 or less, and more preferably 5.0 or more and 9.0 or less.

When the dispersity (Mw/Mn) is 3.0 or more, certain amounts of high molecular weight components and low molecular weight components are each present in the membrane, the high molecular weight components ensure appropriate heat resistance and strength, and due to the presence of the low molecular weight components, favorable shutdown performance can be exhibited in the vicinity of 130° C. When the dispersity (Mw/Mn) is 10.0 or less, contamination due to bleeding out of the low molecular weight components can be prevented, which is preferable.

In gel permeation chromatography (GPC) measurement of the microporous membrane, the microporous membrane preferably contains 15% or more of molecules having a molecular weight of 50,000 or less and 15% or more of molecules having a molecular weight of 500,000 or more. The microporous membrane is excellent in friction resistance by containing molecules having a molecular weight of 50,000 or less and 500,000 or more and has a small dimensional change below the melting point. In addition, in the vicinity of the melting point (for example, 130° C.) of the microporous membrane, the both molecules melt and then shrink rapidly. Moreover, in the microporous membrane, the low molecular weight component having a molecular weight of 50,000 or less secures favorable kneadability, and the high molecular weight component having a molecular weight of 500,000 or more secures strength and elongation. Here, the molecular weight obtained by GPC measurement is that converted in terms of polystyrene (PS) as a standard polymer. The molecular weight distribution data of the polyolefin resin porous membrane of the present invention were obtained by multiplying the determined polystyrene-equivalent molecular weight distribution data of each sample by 0.43 (Q factor of polyethylene/Q factor of polystyrene=17.7/41.3). The microporous membrane more preferably contains 17% or more of molecules having a molecular weight of 50,000 or less and 17% or more of molecules having a molecular weight of 500,000 or more in GPC measurement, and it further preferably contains 19% or more of molecules having a molecular weight of 50,000 or less and 19% or more of molecules having a molecular weight of 500,000 or more.

The microporous membrane preferably has the ratio (MD/TD elastic modulus ratio) of the MD elastic modulus (elastic modulus in MD) to the TD elastic modulus (elastic modulus in TD) of 1.7 or more and 3.0 or less. When the MD/TD elastic modulus ratio is 1.7 or more, even if an impact is applied to a secondary battery including a microporous membrane as a separator, the edge portion is not constrained, from which deformation is focused in the TD direction of the separator that hardly ruptures, giving rise to no likelihood of membrane rupture. In general, the roll obtained by winding the separator in MD is restricted in movement along the MD for fixation of wound membranes and prone to tear easily in the MD. However, when the MD/TD elasticity modulus ratio is 3.0 or less, longitudinal tearing (tearing in MD) of the microporous membrane is not prone to occur easily. These tendencies are remarkable in the polyolefin microporous membrane according to the third embodiment when having the specific MD/TD thermal shrinkage ratio. From such a viewpoint, the MD/TD elastic modulus ratio is more preferably 1.9 or more and 2.8 or less, and further preferably 2.1 or more and 2.5 or less.

<Microporous Membrane Manufacture Method>

Another aspect of the present invention is a method for manufacturing a polyolefin microporous membrane.

The method for manufacturing the polyolefin microporous membrane according to the fifth embodiment comprises the following steps of:

(A) synthesizing a polyethylene or ethylene constitutional unit-containing copolymer using a monomer and a Ziegler-Natta catalyst to obtain a polyethylene raw material.

(B) molding a polyolefin composition containing the polyethylene raw material into a sheet and stretching the sheet; and (C) subjecting the sheet to extraction and heat-setting to form a polyolefin microporous membrane having the TD heat shrinkage at 120° C. of 8.0% or less, and the TD heat shrinkage at 130° C. of 3 to 5 times greater than the TD heat shrinkage at 120° C. and of at least 12.0% greater than the TD heat shrinkage at 120° C.

The method for manufacturing a polyolefin microporous membrane according to the sixth embodiment comprises the following step:

(B-1) a step of simultaneous biaxial or sequential biaxial stretching of a molded sheet composed of the polyolefin composition wherein a ratio (MD/TD strain rate ratio) of a MD strain rate to a TD strain rate is 1.2 or more and 1.8 or less.

The method for manufacturing the polyolefin microporous membrane according to the seventh embodiment comprises the following steps:

(C-1) a step in which a stretched sheet is subjected to extraction and TD stretching at the TD strain rate of 20%/second or more; and (C-2) a step of relaxing the TD stretched sheet at a relaxation rate of 10%/second or less.

By the steps of (C-1) and (C-2), the molded sheet or the microporous membrane composed of the polyolefin composition can be mildly relaxed after the rapid stretching thereof.

The method for manufacturing the polyolefin microporous membrane according to the eighth embodiment comprises any combination of all the steps described above.

The steps of manufacturing the polyolefin microporous membrane and the preferred embodiment will be described below.

[Synthesis Step of Resin Raw Materials]

In the synthetic step of the polyethylene raw material, monomers are polymerized to synthesize a polyethylene or ethylene constitutional unit-containing copolymer. This step preferably includes the step (A).

The use of a Ziegler-Natta catalyst in the synthesis of the polyethylene raw material reduces the polarization by obtaining a polymer with appropriate linearity, thereby reducing the friction of the polyethylene raw material and consequently improving the impact resistance of the secondary battery. Moreover, the polyethylene synthesized by the Ziegler-Natta catalyst has an appropriate molecular weight distribution, which suppresses the dimensional change of the microporous membrane containing the polyethylene raw material below the melting point of the polyethylene raw material, and allows the microporous membrane to shrink rapidly in the vicinity of the melting point (for example, 130° C.). Moreover, when the Ziegler-Natta catalyst is used, the low molecular weight components of the obtained polymer enhance kneadability of the polyethylene raw materials, and the high molecular weight components of the obtained polymer secure strength and elongation.

[Molding and Stretching Steps]

In the molding and stretching steps, molding and stretching of the polyolefin composition are carried out. The step preferably includes the step (B) or (B-1). The polyolefin composition can be molded into, for example, sheet form.

(Molding)

Molding of the polyolefin composition can be carried out by the following methods, for example, (1) a method for melt-kneading a polyolefin composition and a pore-forming material to mold into sheet form, (2) a method for melt-kneading a polyolefin composition and extruding it at a high draw ratio, (3) a method for melt-kneading a polyolefin composition and an inorganic filler to mold into sheet form. The aforementioned methods (1) and (3) will be described below as examples.

First, the polyolefin resin composition and the pore-forming material are melt-kneaded. As the melt-kneading method, an example thereof includes such as feeding the polyolefin resin and if necessary, other additives into a resin-kneading apparatus such as an extruder, kneader, laboplastmill, kneading roll, Banbury mixer, etc., to introduce and knead the pore-forming material at an arbitrary ratio while heat melting the resin components.

The pore-forming material may include a plasticizer, inorganic material, or combination thereof.

Although the plasticizer is not particularly restricted, a non-volatile solvent that can form a uniform solution above the melting point of polyolefin is preferably used. Specific examples of such a non-volatile solvent include, for example, hydrocarbons such as liquid paraffin, paraffin wax, etc.; esters such as dioctyl phthalate, dibutyl phthalate, etc.; and higher alcohols such as oleyl alcohol, stearyl alcohol, etc. Here, these plasticizers may be recovered by distillation, etc., after extraction and reutilized. Furthermore, the polyolefin resin, other additive and plasticizer are preliminarily kneaded at a prescribed ratio using a Henschel mixer, etc., before introduced these into the resin-kneading apparatus. More preferably, in the pre-kneading, a part of the plasticizer to be used is fed, and the remaining plasticizer is kneaded while being appropriately heated and side-fed to the resin kneading apparatus. By using such a kneading method, the dispersibility of the plasticizer is enhanced, and when stretching a sheet molding of a melt-kneaded product of the resin composition and the plasticizer in a later step, the sheet molding tends to be stretchable at a high ratio without rupture of the membrane.

Among the plasticizers, liquid paraffin is preferred because when the polyolefin resin is polyethylene or polypropylene, liquid paraffin is highly compatible with these, and even when the melt-kneaded product is stretched, interfacial stripping between the resin and the plasticizer hardly occurs, which is prone to facilitate uniform stretching.

The ratio of the polyolefin resin composition to the plasticizer is not particularly limited provided that these can be melt-kneaded uniformly to mold into sheet form. For example, the weight fraction of the plasticizer in the composition composed of the polyolefin resin composition and the plasticizer is preferably 20 to 90% by weight, and more preferably 30 to 80% by weight. When the weight fraction of the plasticizer is 90% by weight or less, the melt tension upon melt-molding tends to be enough to improve the moldability. On the other hand, when the weight fraction of the plasticizer is 20% by weight or more, no scission of the polyolefin molecules occurs even when the mixture of the polyolefin resin composition and the plasticizer is stretched at a high ratio, facilitating to form a uniform and microporous structure and to increase strength.

The inorganic material is not particularly limited, and, examples thereof include oxide-based ceramics such as alumina, silica (silicon oxide), titania, zirconia, magnesia, ceria, yttria, zinc oxide, iron oxide, etc.; nitride-based ceramics such as silicon nitride, titanium nitride, boron nitride, etc.; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, kieselguhr, silica sand, etc.; and glass fibers. These may be used alone or in combination of two or more. Among these, silica, alumina and titania are preferable from the viewpoint of electrochemical stability, with silica being more preferable from the viewpoint of facilitating extraction from a sheet molding.

The ratio of the inorganic material to the polyolefin resin composition is preferably 5% by weight or more, and more preferably 10% by weight or more, based on the total weight of these, from the viewpoint of obtaining favorable separability, and it is preferably 99% by weight or less and more preferably 95% by weight or less from a viewpoint of ensuring high strength.

In the case of melt-kneading with an extruder, a ratio (Q/N, unit: kg/(h·rpm)) of an extrusion rate of the polyolefin composition (i.e., extrusion rate Q (the unit: kg/hour) of the extruder) to a number N (rpm) of screw rotation of the extruder is preferably 2.0 or more and 7.0 or less, more preferably 3.0 or more and 6.0 or less, and still more preferably 4.0 or more and 5.0 or less. When melt-kneading under the condition of Q/N of 2.0 or more and less than 7.0, a convex and concave is appropriately formed on the surface of the melt-kneaded product by controlling the bleeding morphology of the plasticizer such as liquid paraffin, etc., facilitating the friction of the polyolefin microporous membrane to be adjusted appropriately.

Next, the melt-kneaded product is formed into sheet form. A method for manufacturing a sheet molding includes, for example, such as extruding a melt-kneaded product into sheet form through a T die, etc., bringing it into contact with a heat conductor, and cooling to a temperature sufficiently lower than the crystallization temperature of the resin component followed by solidification thereof. As the heat conductor used for cooling and solidification, a metal, water, air, plasticizer, etc., are included. Among these, a metal roll is preferable for use because of high heat conduction efficiency. Moreover, when the extruded kneaded-product contacts with the metal roll, it is more preferably sandwiched with at least a pair of rolls since the efficiency of heat conduction is enhanced as well as the sheet is oriented to increase the film strength, and the surface smoothness of the sheet also tends to be increased. The die lip gap when extruding the melt-kneaded product in sheet form from the T die is preferably 200 µm or more and 3,000 µm or less, and more preferably 500 µm or more and 2,500 µm or less. When the die lip gap is 200 µm or more, resin wastes, etc., are reduced, the influence on the membrane quality such as streaks and defects is small, and the risk of the membrane rupture, etc., can be reduced in the subsequent stretching step. On the other hand, when the die lip gap is 3,000 µm or less, the cooling rate is fast, which enables to prevent cooling unevenness, and the thickness stability of the sheet can be maintained.

The sheet molding may be also subjected to rolling. The rolling can be carried out by, for example, a press method using a double belt press machine, etc. By rolling the sheet molding, the orientation of in particular, the surface layer portion can be increased. The rolling ratio by area is preferably more than 1 time and 3 times or less, and more preferably more than 1 time and 2 times or less. When the rolling ratio is more than 1 time, the plane orientation tends to be increased and the membrane strength of the finally obtained separator tends to be increased. On the other hand, when the rolling ratio is 3 times or less, the difference in orientation between the surface layer portion and the inside of the center is small, which has a likelihood of facilitating formation of a uniform porous structure in the thickness direction of the membrane.

(Stretching)

The stretching step in which the sheet molding or the porous membrane is subjected to stretching may be carried out before a step (pore-forming step) of extracting the pore-forming material from the sheet molding, or may be carried out for the porous membrane in which the pore-forming material was extracted from the sheet molding. Furthermore, it may be carried out before and after extracting the pore-forming material from the sheet molding.

Although either uniaxial stretching or biaxial stretching can be suitably applied as the stretching treatment, biaxial stretching is preferable from the viewpoint of improving the strength, etc., of the obtained porous membrane. Moreover, from the standpoint of the heat shrinkage property of the obtained porous membrane, it is preferable to carry out the stretching step at least twice.

Upon biaxial stretching of the sheet molding at a high stretching ratio, the molecules are oriented in a plane direction, and the porous membrane finally obtained hardly tears and has high puncture strength. Examples of the stretching method include such as simultaneous biaxial stretching, sequential biaxial stretching, multistage stretching, multiple-time stretching, etc. Simultaneous biaxial stretching is preferable from the viewpoint of improvement in puncture strength, uniformity of stretching, and shutdown property. Further, from the viewpoint of controllability of plane orientation, sequential biaxial stretching is preferred.

Here, simultaneous biaxial stretching is referred to as a stretching method in which MD (machine direction of continuous processing of microporous membrane) stretching and TD (transverse direction crossing the MD of the microporous membrane at an angle of 90°) stretching are simultaneously carried out, and the stretching ratio in each direction may be different. Sequential biaxial stretching is referred to as a stretching method in which the MD stretching and TD stretching are each carried out independently, and upon MD stretching or TD stretching, the other direction is in a non-constrained state or in anchored state with fixed length.

The stretching ratio is preferably in the range of 20 times or more and 100 times or less in terms of a ratio by area, and more preferably in the range of 25 times or more and 70 times or less. The stretching ratio in each axial direction is preferably 4 times or more and 10 times or less in MD and 4 times or more and 10 times or less in TD, and more preferably 5 times or more and 8 times or less in MD and 5 times or more and 8 times or less in TD. When the total ratio by area is 20 times or more, sufficient strength tends to be imparted to the obtained microporous membrane, while when the total ratio by area is 100 times or less, membrane rupture during the stretching step is prevented and high productivity tends to be achieved.

In simultaneous biaxial or sequential biaxial stretching of a sheet molding or porous membrane, a ratio (MD/TD strain rate ratio) of a MD strain rate to a TD strain rate is preferably 1.2 or more and 1.8 or less, more preferably 1.3 or more and 1.7 or less, and still more preferably 1.4 or more and 1.6 or less. When simultaneous biaxial or sequential biaxial stretching is carried out at the MD/TD strain rate ratio of 1.2 or more and 1.8 or less, a microporous membrane excellent in heat shrinkage property, for example, a polyolefin microporous membrane having the TD heat shrinkage at 120° C. of 8.0% or less, and the TD heat shrinkage at 130° C. of 3 to 5 times greater than the TD heat shrinkage at 120° C. and of at least 12.0% larger than the TD heat shrinkage at 120° C., tends to be obtained. This tendency is remarkable in the method for manufacturing the polyolefin microporous membrane according to the fifth and sixth embodiments.

[Pore-Forming (Extraction) Step]

In the pore-forming (extraction) step, the pore-forming material is removed from the sheet molding to form a porous membrane. This step can be carried out before and/or after the stretching step and can be included in the step (C).

As a method for removing the pore-forming material, an example thereof includes such as immersing the sheet molding in an extraction solvent to extract the plasticizer followed by fully drying. The pore-forming material may be extracted either batchwise or continuously. In order to suppress the shrinkage of the porous material, it is preferable to constrain edges of the sheet molding in a series of steps such as immersion and drying. Moreover, it is preferable to adjust the amount of residual pore-forming material in the porous membrane to less than 1% by weight with respect to the weight of the entire porous membrane.

As an extraction solvent used when extracting the pore-forming material form the sheet molding, it is preferable to use a solvent which is a poor solvent for the polyolefin resin and a good solvent for the pore-forming material and has a boiling point lower than the melting point of the polyolefin resin. Examples of such extraction solvents include hydrocarbons such as n-hexane, cyclohexane, etc.; halogenated hydrocarbons such as methylene chloride, 1,1,1-trichloroethane, etc.; non-chlorinated halogenated solvents such as hydrofluoroether, hydrofluorocarbon, etc.; alcohols such as ethanol, isopropanol, etc.; ethers such as diethyl ether, tetrahydrofuran, etc.; and ketones such as acetone, methyl ethyl ketone, etc. These extraction solvents may be recovered by distillation, etc., and reutilized. Moreover, when an inorganic material is used for the pore-forming material, an aqueous solution of sodium hydroxide, potassium hydroxide, etc., may be used for an extraction solvent.

[Heat Setting Step]

In the heat setting step, for the purpose of suppressing shrinkage of the porous membrane, heat treatment is carried out with the aim of heat setting after the stretching step or after formation of the porous membrane. This step can be included in the step (C), (C-1) or (C-2). Moreover, the porous membrane may be subjected to post-treatments such as hydrophilization treatment with a surfactant, etc., crosslinking treatment with an ionizing radiation, etc.

The porous membrane is preferably subjected to heat treatment for the purpose of heat setting from the viewpoint of suppressing shrinkage. As a method of heat treatment, with the aim of adjusting physical properties, examples of the heat treatment include stretching operation carried out at a prescribed temperature atmosphere and prescribed stretching ratio, and/or relaxation operation carried out at a prescribed temperature atmosphere and prescribed relaxation ratio for the purpose of reduction of stretching stress. The relaxation operation may be carried out after the stretching operation. These heat treatments can be carried out using a tenter or a roll stretcher.

The stretching operation is preferably carried out by stretching 1.1 times or more, and more preferably 1.2 times or more in MD and/or TD of the membrane, from the viewpoint of obtaining a porous membrane with higher strength and higher porosity.

The relaxation operation is a shrinking operation of the membrane in MD and/or TD. The relaxation ratio is a value obtained by dividing the dimension of the membrane after the relaxation operation by the dimension of the membrane before the relaxation operation. When relaxation was carried out in the both MD and TD, the relaxation ratio means a value obtained by multiplying the MD relaxation ratio and the TD relaxation ratio. The relaxation ratio is preferably 1.0 or less, more preferably 0.97 or less, and still more preferably 0.95 or less. The relaxation ratio is preferably 0.5 or more from the viewpoint of membrane quality. The relaxation operation may be carried out in both directions of MD and TD, however, may be carried out in either MD or TD.

The stretching and relaxation operations after this plasticizer extraction are preferably carried out in the TD. The temperature of the stretching and relaxation operations is preferably lower than the melting point of the polyolefin resin, and more preferably within a range of 1° C. lower than the melting point to 25° C. lower than the melting point. When the temperature in the stretching and relaxation operations is within the aforementioned range, it is preferable from balance of reduction of heat shrinkage and porosity.

When carrying out TD stretching in the heat setting step of the sheet subjected to extraction after stretching, the strain rate in the TD stretching step is preferably 20%/second or more, more preferably 25%/second or more, and still more preferably 30%/second or more. When the TD stretching in the heat setting step is carried out at a strain rate of 20%/second or more, the microporous membrane excellent in heat shrinkage property, for example, a polyolefin microporous membrane having the TD heat shrinkage at 120° C. of 8.0% or less, and the TD heat shrinkage at 130° C. of 3 to 5 times greater than the TD heat shrinkage at 120° C. and of at least 12.0% larger than the TD heat shrinkage at 120° C., tends to be obtained. This tendency is remarkable in the method for manufacturing the polyolefin microporous membrane according to the fifth and seventh embodiments.

When carrying out relaxation operation in TD after the stretching step, the relaxation rate is preferably 10%/second or less, more preferably 8%/second or less, and still more preferably 6%/second or less. When the relaxation operation is carried out at a relaxation rate of 10%/second or less, the microporous membrane excellent in the heat shrinkage property, for example, a polyolefin microporous membrane having the TD heat shrinkage at 120° C. of 8.0% or less, and the TD heat shrinkage at 130° C. of 3 to 5 times greater than the TD heat shrinkage at 120° C. and of at least 12.0% larger than the TD heat shrinkage at 120° C., tends to be obtained. This tendency is remarkable in the method for manufacturing the polyolefin microporous membrane according to the fifth and seventh embodiments.

<Separator for Secondary Battery>

The polyolefin microporous membrane according to the present embodiment can be used as a separator for a secondary battery. The separator comprising the polyolefin microporous membrane according to the present embodiment suppresses shrinkage up to external temperatures in the vicinity of 120° C. and promptly shuts down at more elevated external temperatures, capable of improving the safety of the secondary battery.

It is noted that the measurement values of various physical properties described above are those measured according to the following Examples unless otherwise specified.

EXAMPLES

The present embodiments will be described below in more detail by way of Examples and Comparative Examples, and the present embodiments are not limited to the following Examples unless otherwise departing from the scope of the gist thereof. It is noted that the physical properties in the Examples below are measured by the following methods.

(1) Viscosity-Average Molecular Weight

The intrinsic viscosity [η] (dl/g) at 135° C. in a decalin solvent based on ASTM-D4020 was measured.

For polyethylene, the viscosity-average molecular weight was calculated using the following equation.

$$[\eta] = 6.77 \times 10^{-4} Mv^{0.67}$$

(2) GPC Measurement

Using a GPC apparatus, a ALC/GPC-150-C-plus (trademark) manufactured by Waters Co., Ltd., with two 30 cm columns of GMH 6-HT (trademark) manufactured by Tosoh Corporation and two 30 cm columns of GMH 6-HTL (trademark) that are connected in series, GPC measurement was carried out at 140° C. at a sample concentration of 0.05% by weight using ortho-dichlorobenzene as a mobile phase solvent.

It is noted that the calibration curve was prepared using commercially available monodisperse polystyrenes with known molecular weights as standard materials, and the molecular weight distribution data converted to those of polyethylene were obtained by multiplying the determined polystyrene-equivalent molecular weight distribution data of each sample by 0.43 (Q factor of polyethylene/Q factor of polystyrene=17.7/41.3). By using the data, the weight-average molecular weight and number-average molecular weight of each sample were calculated to obtain the molecular weight distribution index (Mw/Mn).

(3) Membrane Thickness (μm)

The membrane thickness was measured at a room temperature of 23° C. using a micro thickness gauge (type KBM, manufactured by Toyo Seiki Co., Ltd.).

(4) Porosity (%)

A 10 cm×10 cm square sample was cut out from the microporous membrane, the volume (cm$^3$) and weight (g) of the sample were measured, and the porosity was calculated from these and the membrane density (g/cm$^3$) using the following equation:

Porosity (%)=(volume−weight/membrane density)/volume×100

(5) Air Permeability (Second)

Air permeation resistance of a sample was measured using a Gurley type air permeability tester, G-B2 (trademark) manufactured by Toyo Seiki Co., Ltd., according to JIS P-8117, and the measurement value was used as an air permeability.

(6) Puncture Strength (Gf)

A separator was set with a sample holder having an opening diameter of 11.3 mm, using a handy compression tester KES-G5 (trademark), manufactured by Kato Tech Co., Ltd. Subsequently, a puncture test was carried out by contacting the center of the set separator and a needle tip with a curvature radius of 0.5 mm under conditions with a puncture speed of 2 mm/second and an atmospheric temperature of 25° C., and the crude puncture strength (gf) was obtained as the maximum puncture load.

(7) Heat Shrinkage (%)

A sample was cut into a square with each side of 100 mm in MD and TD, the sample was placed in a hot air dryer previously heated to 120° C. or 130° C., and the dimensional shrinkage (%) after 1 hour was determined. The sample was placed on a copy paper, etc., so as not to adhere to the inner wall of the dryer, etc., or not to melt and adhere to each other. The MD heat shrinkage and the TD heat shrinkage were each calculated according to the following equations:

MD heat shrinkage (%)=(100−dimension in MD after heating)/100×100(%)

TD heat shrinkage (%)=(100−dimension in TD after heating)/100×100(%)

From the heat shrinkage values obtained, the ratio (MD/TD heat shrinkage ratio) of the MD heat shrinkage to the TD heat shrinkage was calculated.

Moreover, when a coating layer containing inorganic particles, heat-resistant resin or adhesive polymer, etc., is formed on the polyolefin microporous membrane, the heat shrinkage of the microporous membrane can be measured by immersing the polyolefin microporous membrane on which the coating layer was formed in an organic solvent capable of dissolving the coating layer, to remove the coating layer.

(8) Coefficient of Dynamic Friction

The coefficient of dynamic friction of the sample having a size of the width of 50 mm and length of 200 mm in measurement direction, was measured three times in MD and TD, respectively and the values obtained were averaged, respectively, using a KES-SE friction tester manufactured by Kato Tech Co., Ltd. under conditions: sample load of 50 g, contactor area of 10×10=100 mm$^2$ (a stainless steel wire (0.5 mmϕ hard stainless steel wire (SUS304 piano wire)) was wound around the contactor twenty times without gap and overlapping with each other), contactor feed speed of 1 mm/second, tension of 6 kPa, temperature of 25° C., and humidity of 50%.

(9) Tensile Elastic Modulus (MPa) in MD (Longitudinal Direction) and TD (Transverse Direction)

For the measurement in MD and TD, a MD sample (120 mm in MD×10 mm in TD) and a TD sample (10 mm in MD×120 mm in TD) were cut out. Under the conditions of the ambient temperature of 23±2° C. and humidity of 40±2%, the tensile moduli of the TD sample and MD sample were measured using a tensile tester Autograph AG-A (trademark) manufactured by Shimadzu Corporation, according to JIS K7127. The sample was set such that the distance between chucks was 50 mm, and the sample was stretched at a tensile speed of 200 mm/minute until the distance between chucks was 60 mm, which means the strain reached 20.0%. The tensile elastic modulus (MPa) was determined from the slope of the strain from at 1.0% to 4.0% in the resulting stress-strain curve. From the obtained elastic modulus, the ratio (MD/TD elastic modulus ratio) of the MD elastic modulus to the TD elastic modulus was calculated.

(10) Meltdown Temperature (° C.)

FIG. 1 (A) shows a schematic diagram illustrating a meltdown temperature measurement apparatus. 1 denotes a microporous membrane, 2A and 2B denote nickel foils with a thickness of 10 μm, and 3A and 3B denote glass plates. An electric resistance measurement device 4 (LCR meter "AG-4311" (trade name) manufactured by Ando Electric Co., Ltd.) is connected to the nickel foils 2A and 2B. A thermocouple 5 is connected to a thermometer 6. A data collector 7 is connected to the electric resistance measurement device 4 and the thermometer 6. 8 denotes an oven that heats the microporous membrane.

More specifically, as shown in FIG. 1 (B), the microporous membrane 1 is overlayed on the nickel foil 2A, and longitudinally fixed with "Teflon" (registered trademark) tape (hatched portion in the figure). The microporous membrane 1 has been impregnated with a 1 mol/liter lithium borofluoride solution (solvent: propylene carbonate/ethylene carbonate/γ-butyl lactone=1/1/2) as an electrolytic solution. As shown in FIG. 1 (C), a "Teflon" (registered trademark) tape (hatched portion in the figure) is adhered on the nickel foil 2B for masking, leaving a 15 mm×10 mm window at the center of foil 2B.

The nickel foil 2A and nickel foil 2B are combined in such a manner as to sandwich the microporous membrane 1, and the two nickel foils are further sandwiched by the glass plates 3A and 3B from both sides of the foils. In this case, the window portion of the foil 2B and the porous membrane 1 are positioned to be opposite to each other.

The two glass plates are fixed by pinching with a commercially available double clip. The thermocouple 5 is fixed to the glass plate with a "Teflon" (registered trademark) tape.

A temperature and electrical resistance are measured continuously using such an apparatus. The temperature is raised from 25° C. to 200° C. at a rate of 2° C./minute, and the electrical resistance value is measured with an alternating current of 1 kHz. After the electrical resistance value exceeded $10^3Ω$, the temperature when the resistance became less than $10^3Ω$ was taken as the meltdown temperature.

(11) Oven Test and Collision Test a. Fabrication of Positive Electrode

A slurry was prepared by dispersing lithium cobalt composite oxide $LiCoO_2$ as a positive electrode active material, graphite and acetylene black as conductive materials in polyvinylidene fluoride (PVDF) and N-methylpyrrolidone (NMP) as binders. A surface of a 15 μm thick aluminum foil to be used as a positive electrode current collector was coated with the slurry using a die coater followed by drying at 130° C. for 3 minutes, and then the coating foil was compression-molded using a roll press machine. The obtained molded product was slit to a width of 57.0 mm to obtain a positive electrode.

b. Fabrication of Negative Electrode

A slurry was prepared by dispersing artificial graphite as a negative electrode active material, an ammonium salt of carboxymethylcellulose and a styrene butadiene rubber latex as binders in purified water. A surface of a copper foil to be used as a negative electrode current collector was coated with the slurry followed by drying at 120° C. for 3 minutes, and thereafter, the coated copper foil was compression-molded with a roll press machine. The obtained molded product was slit to a width of 58.5 mm to obtain a negative electrode.

c. Preparation of Nonaqueous Electrolytic Solution $LiPF_6$ as a solute was dissolved to 1 mol/L in a mixed solvent of ethylene carbonate, dimethyl carbonate and ethyl methyl carbonate wherein the volume ratio thereof is 1:1:2, to prepare a nonaqueous electrolytic solution.

d. Battery Assembly

After laminating the positive electrode, each porous membrane obtained in the Examples or the Comparative Examples, and the negative electrode, a wound electrode body was fabricated by a conventional method. The number of winding was adjusted corresponding to the thickness of the PO microporous membrane. The outermost peripheral end of the obtained wound electrode body was fixed with an insulating tape. The negative electrode lead was welded to the battery can, the positive electrode lead to the safety valve, respectively, and the wound electrode body was inserted into the inside of the battery can. Thereafter, 5 g of a nonaqueous electrolytic solution was injected into the battery can, and the lid was crimped to the battery can via a gasket to obtain a cylindrical secondary battery having an outer diameter of 18 mm and a height of 65 mm. This cylindrical secondary battery was charged for a total of 3 hours by a method of applying voltage of 4.2 V with a current of 0.2 C (a current of 0.2 times as great as the 1 hour rate (1 C) of the rated electric capacity) in an atmospheric temperature of 25° C., and reducing current while holding voltage of 4.2V after reaching it. Subsequently, the battery was discharged down to battery voltage of 3.0V with a current value of 0.2 C. The percentage (%) of cells maintaining a capacity of 0% or more was calculated as the self-discharge characteristic.

e. Oven Test

Using the secondary battery assembled in d., the charged secondary battery was heated from room temperature to 120° C. at a rate of 5° C./minute and allowed to stand for 30 minutes. Thereafter, the temperature of the secondary battery was further raised to 150° C. at 30° C./minute, and the time until ignition was measured, which was ranked according to the following criteria for a battery that ignited within the specific time and temperature. For these evaluation items below, A (good) and B (acceptable) were regarded as acceptable criteria.

A (good): A battery that did not ignite for 45 minutes or longer at 150° C.

B (acceptable): A battery that ignited in 30 minutes or longer and less than 45 minutes at 150° C.

C (improper): A battery that ignited in less than 30 minutes at 150° C. or before reaching 150° C.

f. Collision Test

Figure 2:
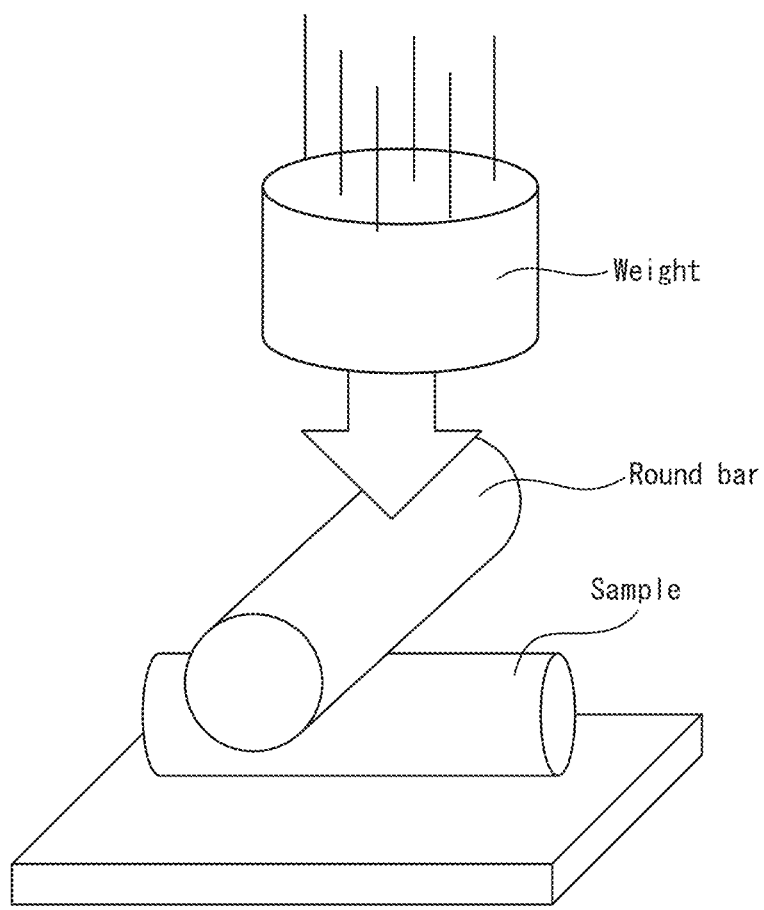
FIG. 2 is a schematic diagram illustrating a collision test.

FIG. 2 is a schematic diagram of a collision test.

In the collision test, the round bar is placed on the sample disposed on the test stand such that the sample and the round bar (4)=15.8 mm) are approximately orthogonal, and from a position at a height of 61 cm from the round bar, a weight of 18.2 kg is dropped onto the top of the round bar to observe the influence of the impact on the sample.

The procedure of the collision test in the Examples and the Comparative Examples will be described below while referring to FIG. 2.

The secondary battery obtained in the above d. was charged with a constant current of 1 C under an environment of 25° C., and after reaching 4.2V, it was charged for a total of 3 hours with a constant voltage of 4.2V.

Next, under an environment of 25° C., the secondary battery was placed sideways on a flat surface, and the stainless steel round rod that was 15.8 mm in diameter was disposed across the center of the secondary battery. The round bar was arranged that its major axis was parallel to the longitudinal direction of the separator. A weight of 18.2 kg was dropped from a height of 61 cm such that an impact was applied at right angle to the longitudinal direction of the secondary battery from a round bar disposed in the center of the secondary battery. After the collision, the surface temperature of the secondary battery was measured. 5 cells each were tested and ranked according to the following criteria for the number of cells having the specific surface temperature rise. In this evaluation, A (good) and B (acceptable) were regarded as acceptable criteria. It is noted that the surface temperature of the secondary battery is a temperature which was measured at the position of 1 cm from the bottom side of the outer package of the secondary battery with a thermocouple (K-type seal type).

A (good): Surface temperature rise of 30° C. or lower in all cells.

B (acceptable): Surface temperature rise of higher than 30° C. and 100° C. or lower for at least one cell, but the surface temperature of 100° C. or lower for all cells.

C (improper): Surface temperature exceeding 100° C. or occurrence of ignition for one or more cells.

(12) Transportability

The film having a length of 1000 m was wound by a winder, and the positional deviation of the edge face after the winding was measured and ranked according to the following criteria to evaluate a positional deviation of the edge face of the wound body. In this evaluation, A (good) and B (acceptable) were regarded as acceptable criteria.

A (good): Positional deviation of the edge face when wound of 1 mm or less.

B (acceptable): Positional deviation of the edge face when wound of greater than 1 mm and 5 mm or less.

C (improper): Positional deviation of the edge face when wound of greater than 5 mm.

Examples 1 to 23 and Comparative Examples 1 to 12

Polyethylene was synthesized using the polyethylene synthesis catalyst listed in any one of Tables 1 to 4 (represented as "synthesis catalyst" in the tables) and an ethylene monomer. As shown in Tables 1 to 4, in each Example, two types of polyethylenes wherein one polyethylene type was described as PE1 and the other PE type was described as PE2, were used in admixture, and the synthesis catalyst, viscosity-average molecular weight, and weight fraction of each of PE1 and PE2 are shown in Tables 1 to 4.

The obtained polyethylene and plasticizer were blended and stirred together with a Henschel mixer to prepare a resin composition. Under the conditions shown in any of Tables 1 to 4, each resin composition was extruded, formed into sheet form, stretched, immersed in methylene chloride to form pores, and heat-set to obtain a polyolefin porous membrane.

The obtained polyolefin porous membranes each were evaluated according to the evaluation methods described above.

The physical properties of the microporous membranes obtained in Examples 1 to 23 and the evaluation results when these were incorporated in secondary batteries are shown in Tables 1 to 3.

The physical properties of the porous membranes obtained in Comparative Examples 1 to 12 and the evaluation results when these were incorporated into secondary batteries are shown in Table 4.

TABLE 1

|  |  | Example 1 | Example 2 | Example 3 | Example 4 | Example 5 | Example 6 |
|---|---|---|---|---|---|---|---|
| Physical | Thickness (μm) | 15 | 13 | 15 | 15 | 15 | 15 |
| properties | Porosity (%) | 42 | 43 | 43 | 43 | 44 | 43 |
|  | Air permeability (second) | 194 | 180 | 210 | 200 | 184 | 218 |
|  | Puncture strength (gf) | 390 | 381 | 381 | 385 | 377 | 385 |
|  | TD heat shrinkage@120° C. (%) | 4.9 | 5.1 | 5.8 | 4.4 | 6.9 | 7.0 |
|  | TD heat shrinkage@130° C. (%) | 19.8 | 20.0 | 23.4 | 16.6 | 30.6 | 33.5 |

TABLE 1-continued

|  |  |  | Example 1 | Example 2 | Example 3 | Example 4 | Example 5 | Example 6 |
|---|---|---|---|---|---|---|---|---|
|  |  | Heat shrinkage ratio TD@130° C./TD@120° C. | 4.0 | 3.9 | 4.0 | 3.8 | 4.4 | 4.8 |
|  |  | Difference of heat shrinkage ratio TD@130° C.-TD@120° C. | 14.9 | 14.9 | 17.6 | 12.2 | 23.7 | 26.5 |
|  |  | Coefficient of dynamic friction | 0.20 | 0.11 | 0.34 | 0.24 | 0.22 | 0.18 |
|  |  | Molecules with GPC molecular weight of 50,000 or less (%) | 19 | 18 | 19 | 27 | 11 | 13 |
|  |  | Molecules with GPC molecular weight of 500,000 or more (%) | 21 | 20 | 20 | 12 | 25 | 14 |
|  |  | Meltdown temperature (° C.) | 172 | 160 | 172 | 151 | 191 | 172 |
|  |  | MD/TD heat shrinkage ratio @120° C. | 1.11 | 1.2 | 1.15 | 1.2 | 1.15 | 1.17 |
|  |  | MD/TD heat shrinkage ratio @130° C. | 0.89 | 0.94 | 0.96 | 0.97 | 0.98 | 0.98 |
|  |  | MD/TD elastic modulus ratio | 2.2 | 2.1 | 2.3 | 2.1 | 2.3 | 2.2 |
| Conditions |  | PE1 synthesis catalyst | Ziegler-Natta | Ziegler-Natta | Ziegler-Natta | Ziegler-Natta | Ziegler-Natta | Ziegler-Natta |
|  |  | PE2 synthesis catalyst | Ziegler-Natta | Ziegler-Natta | Ziegler-Natta | Ziegler-Natta | Ziegler-Natta | Ziegler-Natta |
|  |  | PE1 viscosity-average molecular weight (Mv) | 250,000 | 250,000 | 250,000 | 250,000 | 250,000 | 250,000 |
|  |  | PE2 viscosity-average molecular weight (Mv) | 700,000 | 700,000 | 700,000 | 500,000 | 500,000 | 400,000 |
|  |  | PE1 proportion (wt %) | 70 | 70 | 70 | 80 | 20 | 50 |
|  |  | PE2 proportion (wt %) | 30 | 30 | 30 | 20 | 80 | 50 |
|  |  | Q/N ratio | 4.0 | 1.8 | 7.2 | 4.0 | 4.0 | 4.0 |
|  | Biaxial stretching | Stretching ratio (times) MD | 7.5 | 7.5 | 7.5 | 7.5 | 7.5 | 7.5 |
|  |  | TD | 5 | 5 | 5 | 5 | 5 | 5 |
|  |  | Stretching temperature (° C.) | 118 | 118 | 118 | 118 | 118 | 118 |
|  |  | MD/TD strain rate ratio | 1.5 | 1.5 | 1.5 | 1.5 | 1.5 | 1.5 |
|  | Heat setting | Stretching ratio (times) | 1.7 | 1.7 | 1.7 | 1.7 | 1.7 | 1.7 |
|  |  | Relaxation ratio (times) | 0.9 | 0.9 | 0.9 | 0.9 | 0.9 | 0.9 |
|  |  | Stretching relaxation temperature (° C.) | 130 | 130 | 130 | 130 | 130 | 130 |
|  |  | Stretching strain rate (%/second) | 26 | 26 | 26 | 26 | 26 | 26 |
|  |  | Relaxation rate (%/second) | 6 | 6 | 6 | 6 | 6 | 6 |
| Evaluation of battery | Oven test | Time before ignition at 150° C. (minute) | >60 | 55 | 58 | 53 | 51 | 42 |
|  |  | Evaluation | A | A | A | A | A | B |
|  | Collision test | Number of cells of 30° C. or lower | 5 | 4 | 2 | 5 | 4 | 5 |
|  |  | Number of cells of 30 to 100° C. | — | 1 | 3 | — | 1 | — |
|  |  | Number of cells of 100° C. or higher | — | — | — | — | — | — |
|  |  | Number of cells that ignited | — | — | — | — | — | — |
|  |  | Evaluation | A | A | B | A | A | A |
|  | Transportability | Evaluation | A | B | A | A | A | A |

TABLE 2

|  |  |  | Example 7 | Example 8 | Example 9 | Example 10 | Example 11 |
|---|---|---|---|---|---|---|---|
| Physical properties |  | Thickness (μm) | 11 | 10 | 14 | 14 | 11 |
|  |  | Porosity (%) | 40 | 42 | 42 | 42 | 41 |
|  |  | Air permeability (second) | 174 | 126 | 180 | 180 | 145 |
|  |  | Puncture strength (gf) | 497 | 479 | 398 | 403 | 485 |
|  |  | TD heat shrinkage@120° C. (%) | 6.1 | 5.5 | 4.8 | 3.4 | 7.7 |
|  |  | TD heat shrinkage@130° C. (%) | 19.8 | 19.1 | 18.1 | 15.8 | 23.4 |
|  |  | Heat shrinkage ratio TD@130° C./TD@120° C. | 3.2 | 3.5 | 3.8 | 4.6 | 3.0 |
|  |  | Difference of heat shrinkage ratio TD@130° C.-TD@120° C. | 13.7 | 13.6 | 13.3 | 12.4 | 15.7 |
|  |  | Coefficient of dynamic friction | 0.28 | 0.26 | 0.27 | 0.26 | 0.32 |
|  |  | Molecules with GPC molecular weight of 50,000 or less (%) | 21 | 21 | 22 | 19 | 19 |
|  |  | Molecules with GPC molecular weight of 500,000 or more (%) | 20 | 20 | 19 | 19 | 20 |
|  |  | Meltdown temperature (° C.) | 182 | 183 | 176 | 185 | 172 |
|  |  | MD/TD heat shrinkage ratio @120° C. | 1.40 | 1.44 | 0.96 | 0.92 | 1.30 |
|  |  | MD/TD heat shrinkage ratio @130° C. | 1.10 | 1.15 | 0.94 | 0.90 | 1.10 |
|  |  | MD/TD elastic modulus ratio | 1.2 | 1.1 | 3.3 | 3.2 | 1.3 |
| Conditions |  | PE1 synthesis catalyst | Ziegler-Natta | Ziegler-Natta | Ziegler-Natta | Ziegler-Natta | Ziegler-Natta |
|  |  | PE2 synthesis catalyst | Ziegler-Natta | Ziegler-Natta | Ziegler-Natta | Ziegler-Natta | Philips |
|  |  | PE1 viscosity-average molecular weight (Mv) | 250,000 | 250,000 | 250,000 | 250,000 | 450,000 |
|  |  | PE2 viscosity-average molecular weight (Mv) | 700,000 | 700,000 | 700,000 | 700,000 | 300,000 |
|  |  | PE1 proportion (wt %) | 70 | 70 | 70 | 70 | 90 |
|  |  | PE2 proportion (wt %) | 30 | 30 | 30 | 30 | 10 |
|  |  | Q/N ratio | 5.7 | 5.7 | 5.7 | 5.7 | 4.0 |
|  | Biaxial stretching | Stretching ratio (times) MD | 7 | 7 | 8.5 | 8.5 | 7 |
|  |  | TD | 6.5 | 6.5 | 4.5 | 4.5 | 6.5 |
|  |  | Stretching temperature (° C.) | 118 | 118 | 118 | 118 | 118 |
|  |  | MD/TD strain rate ratio | 1.1 | 1.1 | 1.9 | 1.9 | 1.1 |

TABLE 2-continued

|  |  |  |  |  |  |  |  |
|---|---|---|---|---|---|---|---|
| | Heat setting | Stretching ratio (times) | 1.7 | 1.7 | 1.7 | 1.7 | 1.7 |
| | | Relaxation ratio (times) | 0.9 | 0.9 | 0.9 | 0.9 | 0.9 |
| | | Stretching relaxation temperature (° C.) | 130 | 130 | 130 | 130 | 130 |
| | | Stretching strain rate (%/second) | 31 | 22 | 31 | 22 | 31 |
| | | Relaxation rate (%/second) | 4 | 9.5 | 4 | 9.5 | 4 |
| Evaluation of battery | Oven test | Time before ignition at 150° C. (minute) | 54 | 52 | 48 | 42 | 44 |
| | | Evaluation | A | A | A | B | B |
| | Collision test | Number of cells of 30° C. or lower | 3 | 3 | 1 | 1 | 2 |
| | | Number of cells of 30 to 100° C. | 2 | 2 | 4 | 4 | 3 |
| | | Number of cells of 100° C. or higher | — | — | — | — | — |
| | | Number of cells that ignited | — | — | — | — | — |
| | | Evaluation | A | A | B | B | B |
| | Transportability | Evaluation | A | A | A | A | A |

| | | | Example 12 | Example 13 | Example 14 | Example 15 |
|---|---|---|---|---|---|---|
| Physical properties | | Thickness (μm) | 11 | 11 | 12 | 10 |
| | | Porosity (%) | 41 | 43 | 40 | 40 |
| | | Air permeability (second) | 146 | 155 | 187 | 145 |
| | | Puncture strength (gf) | 491 | 462 | 497 | 497 |
| | | TD heat shrinkage@120° C. (%) | 4.5 | 4.0 | 7.9 | 7.2 |
| | | TD heat shrinkage@130° C. (%) | 21.6 | 19.8 | 37.0 | 23.5 |
| | | Heat shrinkage ratio TD@130° C./TD@120° C. | 4.8 | 5.0 | 4.7 | 3.3 |
| | | Difference of heat shrinkage ratio TD@130° C.-TD@120° C. | 17.1 | 15.8 | 29.1 | 16.3 |
| | | Coefficient of dynamic friction | 0.15 | 0.34 | 0.11 | 0.11 |
| | | Molecules with GPC molecular weight of 50,000 or less (%) | 18 | 26 | 13 | 14 |
| | | Molecules with GPC molecular weight of 500,000 or more (%) | 18 | 13 | 28 | 14 |
| | | Meltdown temperature (° C.) | 182 | 146 | 200< | 192 |
| | | MD/TD heat shrinkage ratio @120° C. | 1.30 | 1.35 | 1.30 | 1.25 |
| | | MD/TD heat shrinkage ratio @130° C. | 1.25 | 1.15 | 1.25 | 1.20 |
| | | MD/TD elastic modulus ratio | 1.3 | 1.2 | 1.3 | 1.2 |
| Conditions | | PE1 synthesis catalyst | Ziegler-Natta | Ziegler-Natta | Ziegler-Natta | Ziegler-Natta |
| | | PE2 synthesis catalyst | metallocene | Philips | metallocene | Philips |
| | | PE1 viscosity-average molecular weight (Mv) | 350,000 | 250,000 | 350,000 | 350,000 |
| | | PE2 viscosity-average molecular weight (Mv) | 400,000 | 200,000 | 600,000 | 350,000 |
| | | PE1 proportion (wt %) | 90 | 80 | 80 | 80 |
| | | PE2 proportion (wt %) | 10 | 20 | 20 | 20 |
| | | Q/N ratio | 4.0 | 4.0 | 4.0 | 4.0 |
| | Biaxial stretching | Stretching ratio (times) MD | 7 | 7 | 7 | 7 |
| | | TD | 6.5 | 6.5 | 6.5 | 6.5 |
| | | Stretching temperature (° C.) | 118 | 118 | 118 | 118 |
| | | MD/TD strain rate ratio | 1.1 | 1.1 | 1.1 | 1.1 |
| | Heat setting | Stretching ratio (times) | 1.7 | 1.7 | 1.7 | 1.7 |
| | | Relaxation ratio (times) | 0.9 | 0.9 | 0.9 | 0.9 |
| | | Stretching relaxation temperature (° C.) | 130 | 130 | 130 | 130 |
| | | Stretching strain rate (%/second) | 31 | 31 | 31 | 31 |
| | | Relaxation rate (%/second) | 4 | 4 | 4 | 4 |
| Evaluation of battery | Oven test | Time before ignition at 150° C. (minute) | 51 | 32 | 34 | 36 |
| | | Evaluation | A | B | B | B |
| | Collision test | Number of cells of 30° C. or lower | 4 | 1 | 3 | 3 |
| | | Number of cells of 30 to 100° C. | 1 | 4 | 2 | 2 |
| | | Number of cells of 100° C. or higher | — | — | — | — |
| | | Number of cells that ignited | — | — | — | — |
| | | Evaluation | A | B | A | A |
| | Transportability | Evaluation | B | A | B | B |

TABLE 3

| | | Example 16 | Example 17 | Example 18 | Example 19 |
|---|---|---|---|---|---|
| Physical properties | Thickness (μm) | 13 | 11 | 15 | 16 |
| | Porosity (%) | 40 | 42 | 43 | 43 |
| | Airpermeability (second) | 160 | 143 | 194 | 211 |
| | Puncture strength (gf) | 382 | 442 | 343 | 360 |
| | TD heat shrinkage@120° C. (%) | 4.5 | 7.2 | 3.8 | 6.2 |
| | TD heat shrinkage@130° C. (%) | 20.0 | 28.3 | 15.9 | 28.0 |

TABLE 3-continued

|  |  |  |  |  |  |  |  |
|---|---|---|---|---|---|---|---|
|  |  | Heat shrinkage ratio TD@130° C./TD@120° C. |  | 4.4 | 3.9 | 4.2 | 4.5 |
|  |  | Difference of heat shrinkage ratio TD@130° C.-TD@120° C. |  | 15.5 | 21.1 | 12.1 | 21.8 |
|  |  | Coefficient of dynamic friction |  | 0.19 | 0.18 | 0.22 | 0.29 |
|  |  | Molecules with GPC molecular weight of 50,000 or less (%) |  | 21 | 21 | 22 | 18 |
|  |  | Molecules with GPC molecular weight of 500,000 or more (%) |  | 21 | 21 | 19 | 22 |
|  |  | Meltdown temperature (° C.) |  | 182 | 178 | 181 | 168 |
|  |  | MD/TD heat shrinkage ratio @120° C. |  | 1.10 | 1.02 | 1.34 | 1.08 |
|  |  | MD/TD heat shrinkage ratio @130° C. |  | 0.92 | 0.94 | 0.99 | 0.93 |
|  |  | MD/TD elastic modulus ratio |  | 2.0 | 1.7 | 2.8 | 2.2 |
| Conditions |  | PE1 synthesis catalyst |  | Ziegler-Natta | Ziegler-Natta | Ziegler-Natta | Ziegler-Natta |
|  |  | PE2 synthesis catalyst |  | Ziegler Natta | Ziegler-Natta | Ziegler-Natta | Philips |
|  |  | PE1 viscosity-average molecular weight (Mv) |  | 250,000 | 250,000 | 250,000 | 350,000 |
|  |  | PE2 viscosity-average molecular weight (Mv) |  | 700,000 | 700,000 | 700,000 | 450,000 |
|  |  | PE1 proportion (wt %) |  | 70 | 70 | 70 | 90 |
|  |  | PE2 proportion (wt %) |  | 30 | 30 | 30 | 10 |
|  |  | Q/N ratio |  | 2.3 | 2.3 | 2.3 | 4.0 |
|  | Biaxial | Stretching ratio (times) | MD | 7 | 7 | 7.5 | 7 |
|  | stretching |  | TD | 5 | 6 | 4.5 | 5 |
|  |  | Stretching temperature (° C.) |  | 118 | 118 | 118 | 118 |
|  |  | MD/TD strain rate ratio |  | 1.4 | 1.2 | 1.8 | 1.4 |
|  | Heat setting | Stretching ratio (times) |  | 1.7 | 1.7 | 1.7 | 1.7 |
|  |  | Relaxation ratio (times) |  | 0.9 | 0.9 | 0.9 | 0.9 |
|  |  | Stretching relaxation temperature (° C.) |  | 130 | 130 | 130 | 130 |
|  |  | Stretching strain rate (%/second) |  | 12 | 12 | 12 | 12 |
|  |  | Relaxation rate (%/second) |  | 12 | 12 | 12 | 12 |
| Evaluation | Oven test | Time before ignition at 150° C. (minute) |  | 58 | 49 | 46 | 44 |
| of battery |  | Evaluation |  | A | A | A | B |
|  | Collision test | Number of cells of 30° C. or lower |  | 5 | 3 | 5 | 2 |
|  |  | Number of cells of 30 to 100° C. |  | — | 2 | — | 3 |
|  |  | Number of cells of 100° C. or higher |  | — | — | — | — |
|  |  | Number of cells that ignited |  | — | — | — | — |
|  |  | Evaluation |  | A | A | A | B |
|  | Transportability | Evaluation |  | A | A | A | A |

|  |  |  |  | Example 20 | Example 21 | Example 22 | Example 23 |
|---|---|---|---|---|---|---|---|
| Physical |  | Thickness (μm) |  | 16 | 15 | 16 | 14 |
| properties |  | Porosity (%) |  | 42 | 44 | 40 | 44 |
|  |  | Airpermeability (second) |  | 217 | 211 | 239 | 163 |
|  |  | Puncture strength (gf) |  | 364 | 351 | 382 | 351 |
|  |  | TD heat shrinkage@120° C. (%) |  | 4.3 | 4.7 | 7.9 | 5.4 |
|  |  | TD heat shrinkage@130° C. (%) |  | 20.6 | 23.3 | 30.5 | 26.2 |
|  |  | Heat shrinkage ratio TD@130° C./TD@120° C. |  | 4.8 | 5.0 | 3.9 | 4.9 |
|  |  | Difference of heat shrinkage ratio TD@130° C.-TD@120° C. |  | 16.3 | 18.6 | 22.6 | 20.8 |
|  |  | Coefficient of dynamic friction |  | 0.12 | 0.35 | 0.10 | 0.11 |
|  |  | Molecules with GPC molecular weight of 50,000 or less (%) |  | 18 | 27 | 13 | 13 |
|  |  | Molecules with GPC molecular weight of 500,000 or more (%) |  | 19 | 12 | 27 | 14 |
|  |  | Meltdown temperature (° C.) |  | 174 | 146 | 200< | 185 |
|  |  | MD/TD heat shrinkage ratio @120° C. |  | 1.06 | 1.21 | 1.35 | 1.28 |
|  |  | MD/TD heat shrinkage ratio @130° C. |  | 0.95 | 1.03 | 1.22 | 1.21 |
|  |  | MD/TD elastic modulus ratio |  | 1.8 | 1.9 | 2.0 | 1.9 |
| Conditions |  | PE1 synthesis catalyst |  | Ziegler-Natta | Ziegler-Natta | Ziegler-Natta | Ziegler-Natta |
|  |  | PE2 synthesis catalyst |  | Metallocene | Philips | Metallocene | Metallocene |
|  |  | PE1 viscosity-average molecular weight (Mv) |  | 350,000 | 250,000 | 350,000 | 350,000 |
|  |  | PE2 viscosity-average molecular weight (Mv) |  | 400,000 | 200,000 | 600,000 | 350,000 |
|  |  | PE1 proportion (wt %) |  | 90 | 80 | 80 | 80 |
|  |  | PE2 proportion (wt %) |  | 10 | 20 | 20 | 20 |
|  |  | Q/N ratio |  | 4.0 | 4.0 | 4.0 | 4.0 |
|  | Biaxial | Stretching ratio (times) | MD | 7 | 7 | 7 | 7 |
|  | stretching |  | TD | 5 | 5 | 5 | 5 |
|  |  | Stretching temperature (° C.) |  | 118 | 118 | 118 | 118 |
|  |  | MD/TD strain rate ratio |  | 1.4 | 1.4 | 1.4 | 1.4 |
|  | Heat setting | Stretching ratio (times) |  | 1.7 | 1.7 | 1.7 | 1.7 |
|  |  | Relaxation ratio (times) |  | 0.9 | 0.9 | 0.9 | 0.9 |
|  |  | Stretching relaxation temperature (° C.) |  | 130 | 130 | 130 | 130 |
|  |  | Stretching strain rate (%/second) |  | 12 | 12 | 12 | 12 |
|  |  | Relaxation rate (%/second) |  | 12 | 12 | 12 | 12 |
| Evaluation | Oven test | Time before ignition at 150° C. (minute) |  | 43 | 34 | 35 | 33 |
| of battery |  | Evaluation |  | B | B | B | B |
|  | Collision test | Number of cells of 30° C. or lower |  | 4 | 1 | 4 | 4 |
|  |  | Number of cells of 30 to 100° C. |  | 1 | 4 | 1 | 1 |
|  |  | Number of cells of 100° C. or higher |  | — | — | — | — |
|  |  | Number of cells that ignited |  | — | — | — | — |
|  |  | Evaluation |  | A | B | A | A |
|  | Transportability | Evaluation |  | B | A | B | B |

TABLE 4

|  |  | Comparative Example 1 | Comparative Example 2 | Comparative Example 3 | Comparative Example 4 | Comparative Example 5 | Comparative Example 6 |
|---|---|---|---|---|---|---|---|
| Physical properties | Thickness (μm) | 15 | 14 | 15 | 15 | 15 | 11 |
|  | Porosity (%) | 42 | 43 | 43 | 43 | 41 | 43 |
|  | Air permeability (second) | 208 | 188 | 198 | 183 | 217 | 159 |
|  | Puncture strength (gf) | 395 | 385 | 381 | 381 | 400 | 468 |
|  | TD heat shrinkage@120° C. (%) | 4.6 | 8.6 | 9.1 | 3.6 | 7.7 | 3.5 |
|  | TD heat shrinkage@130° C. (%) | 24.4 | 24.1 | 26.8 | 18.8 | 21.0 | 18.6 |
|  | Heat shrinkage ratio TD@130° C./TD@120° C. | 5.3 | 2.8 | 2.9 | 5.2 | 2.7 | 5.3 |
|  | Difference of heat shrinkage ratio TD@130° C.-TD@120° C. | 19.8 | 15.5 | 17.7 | 15.2 | 13.3 | 15.1 |
|  | Coefficient of dynamic friction | 0.37 | 0.09 | 0.31 | 0.36 | 0.05 | 0.41 |
|  | Molecules with GPC molecular weight of 50,000 or less (%) | 23 | 19 | 17 | 24 | 14 | 28 |
|  | Molecules with GPC molecular weight of 500,000 or more (%) | 14 | 18 | 17 | 16 | 13 | 13 |
|  | Meltdown temperature (° C.) | 152 | 176 | 147 | 148 | 168 | 148 |
|  | MD/TD heat shrinkage ratio @120° C. | 1.13 | 1.14 | 1.04 | 1.12 | 1.20 | 1.32 |
|  | MD/TD heat shrinkage ratio @130° C. | 0.96 | 0.95 | 0.96 | 0.94 | 0.98 | 1.11 |
|  | MD/TD elastic modulus ratio | 2.1 | 2.0 | 2.1 | 2.2 | 2.3 | 1.3 |
| Conditions | PE1 synthesis catalyst | Ziegler-Natta | Ziegler-Natta | Ziegler-Natta | Ziegler-Natta | Ziegler-Natta | Ziegler-Natta |
|  | PE2 synthesis catalyst | Philips | Metallocene | Metallocene | Philips | Metallocene | Philips |
|  | PE1 viscosity-average molecular weight (Mv) | 350,000 | 250,000 | 300,000 | 350,000 | 250,000 | 350,000 |
|  | PE2 viscosity-average molecular weight (Mv) | 200,000 | 400,000 | 300,000 | 200,000 | 400,000 | 200,000 |
|  | PE1 proportion (wt %) | 60 | 60 | 70 | 60 | 40 | 40 |
|  | PE2 proportion (wt %) | 40 | 40 | 30 | 40 | 60 | 60 |
|  | Q/N ratio | 4.0 | 4.0 | 4.0 | 4.0 | 4.0 | 4.0 |
| Biaxial stretching | Stretching ratio (times) MD | 7.5 | 7.5 | 7.5 | 7.5 | 7.5 | 7 |
|  | TD | 5 | 5 | 5 | 5 | 5 | 6.5 |
|  | Stretching temperature (° C.) | 118 | 118 | 118 | 118 | 118 | 118 |
|  | MD/TD strain rate ratio | 1.5 | 1.5 | 1.5 | 1.5 | 1.5 | 1.1 |
| Heat setting | Stretching ratio (times) | 1.7 | 1.7 | 1.7 | 1.7 | 1.7 | 1.7 |
|  | Relaxation ratio (times) | 0.9 | 0.9 | 0.9 | 0.9 | 0.9 | 0.9 |
|  | Stretching relaxation temperature (° C.) | 130 | 130 | 130 | 130 | 130 | 130 |
|  | Stretching strain rate (%/second) | 26 | 26 | 26 | 12 | 12 | 26 |
|  | Relaxation rate (%/second) | 6 | 6 | 6 | 12 | 12 | 6 |
| Evaluation of battery | Oven test Time before ignition at 150° C. (minute) | 19 | Ignition before reaching 150° C. | Ignition before reaching 150° C. | 11 | 22 | 8 |
|  | Evaluation | C | C | C | C | C | C |
|  | Collision test Number of cells of 30° C. or lower | 1 | 3 | 1 | 2 | 3 | — |
|  | Number of cells of 30 to 100° C. | 2 | 2 | 4 | 2 | 2 | 2 |
|  | Number of cells of 100° C. or higher | 2 | — | — | 1 | — | 2 |
|  | Number of cells that ignited | — | — | — | — | — | 1 |
|  | Evaluation | C | A | B | C | A | C |
| Transportability | Evaluation | A | C | C | A | C | A |

|  |  | Comparative Example 7 | Comparative Example 8 | Comparative Example 9 | Comparative Example 10 | Comparative Example 11 | Comparative Example 12 |
|---|---|---|---|---|---|---|---|
| Physical properties | Thickness (μm) | 12 | 12 | 10 | 14 | 12 | 12 |
|  | Porosity (%) | 40 | 40 | 43 | 43 | 43 | 43 |
|  | Air permeability (second) | 181 | 167 | 150 | 185 | 165 | 152 |
|  | Puncture strength (gf) | 497 | 418 | 468 | 393 | 468 | 468 |
|  | TD heat shrinkage@120° C. (%) | 8.2 | 4.9 | 7.1 | 3.4 | 9.6 | 6.1 |
|  | TD heat shrinkage@130° C. (%) | 31.4 | 16.1 | 36.7 | 14.2 | 44.0 | 16.1 |
|  | Heat shrinkage ratio TD@130° C./TD@120° C. | 3.8 | 3.3 | 5.2 | 4.2 | 4.6 | 2.6 |
|  | Difference of heat shrinkage ratio TD@130° C.-TD@120° C. | 23.2 | 11.2 | 29.6 | 10.8 | 34.4 | 10.0 |
|  | Coefficient of dynamic friction | 0.07 | 0.20 | 0.18 | 0.31 | 0.42 | 0.04 |
|  | Molecules with GPC molecular weight of 50,000 or less (%) | 16 | 20 | 18 | 26 | 13 | 10 |
|  | Molecules with GPC molecular weight of 500,000 or more (%) | 21 | 21 | 21 | 12 | 27 | 12 |
|  | Meltdown temperature (° C.) | 174 | 163 | 172 | 148 | >200 | 172 |
|  | MD/TD heat shrinkage ratio @120° C. | 1.20 | 0.98 | 1.48 | 1.51 | 1.35 | 1.25 |
|  | MD/TD heat shrinkage ratio @130° C. | 1.12 | 0.95 | 1.39 | 1.41 | 1.12 | 1.13 |
|  | MD/TD elastic modulus ratio | 1.2 | 3.5 | 1.1 | 3.3 | 1.1 | 1.2 |
| Conditions | PE1 synthesis catalyst | Ziegler-Natta | Ziegler-Natta | Ziegler-Natta | Ziegler-Natta | Ziegler-Natta | Ziegler-Natta |
|  | PE2 synthesis catalyst | Metallocene | Ziegler-Natta | Ziegler-Natta | Philips | Philips | Metallocene |
|  | PE1 viscosity-average molecular weight (Mv) | 250,000 | 250,000 | 250,000 | 250,000 | 1000,000 | 250,000 |
|  | PE2 viscosity-average molecular weight (Mv) | 400,000 | 700,000 | 700,000 | 200,000 | 300,000 | 400,000 |
|  | PE1 proportion (wt %) | 40 | 70 | 70 | 80 | 60 | 20 |
|  | PE2 proportion (wt %) | 60 | 30 | 30 | 20 | 40 | 80 |
|  | Q/N ratio | 4.0 | 4.0 | 4.0 | 4.0 | 7.2 | 1.8 |

TABLE 4-continued

| | | | | | | | | |
|---|---|---|---|---|---|---|---|---|
| | Biaxial stretching | Stretching ratio (times) MD | 7 | 8.5 | 7 | 8.5 | 7 | 7 |
| | | TD | 6.5 | 4.5 | 6.5 | 4.5 | 6.5 | 6.5 |
| | | Stretching temperature (° C.) | 118 | 118 | 118 | 118 | 118 | 118 |
| | | MD/TD strain rate ratio | 1.1 | 1.9 | 1.1 | 1.9 | 1.1 | 1.1 |
| | Heat setting | Stretching ratio (times) | 1.7 | 1.7 | 1.7 | 1.7 | 1.7 | 1.7 |
| | | Relaxation ratio (times) | 0.9 | 0.9 | 0.9 | 0.9 | 0.9 | 0.9 |
| | | Stretching relaxation temperature (° C.) | 130 | 130 | 130 | 130 | 130 | 130 |
| | | Stretching strain rate (%/second) | 26 | 12 | 12 | 12 | 12 | 12 |
| | | Relaxation rate (%/second) | 6 | 12 | 12 | 12 | 12 | 12 |
| Evaluation of battery | Oven test | Time before ignition at 150° C. (minute) | Ignition before reaching 150° C. | 20 | 23 | 3 | Ignition before reaching 150° C. | 11 |
| | | Evaluation | C | C | C | C | C | C |
| | Collision test | Number of cells of 30° C. or lower | 2 | 1 | 2 | 1 | — | 2 |
| | | Number of cells of 30 to 100° C. | 3 | 2 | 3 | 3 | — | 3 |
| | | Number of cells of 100° C. or higher | — | 2 | — | 1 | 3 | — |
| | | Number of cells that ignited | — | — | — | — | 2 | — |
| | | Evaluation | B | C | B | C | C | B |
| | Transportability | Evaluation | C | A | A | A | A | C |

EXPLANATION OF SYMBOLS

1 Microporous membrane
2A, 2B Nickel foil
3A, 3B Glass plates
4 Electric resistance measurement apparatus
5 Thermocouple
6 Thermometer
7 Data collector
8 Oven

The invention claimed is:

1. A polyolefin microporous membrane having a TD thermal shrinkage at 120° C. of 8% or less, and a TD thermal shrinkage at 130° C. of 3 to 5 times as great as the TD thermal shrinkage at 120° C. and of at least 12% greater than the TD thermal shrinkage at 120° C.

2. The polyolefin microporous membrane according to claim 1, wherein a coefficient of dynamic friction of the membrane is 0.10 or more and 0.35 or less.

3. The polyolefin microporous membrane according to claim 1 or 2, comprising 15% or more of molecules having a molecular weight of 50,000 or less and 15% or more of molecules having a molecular weight of 500,000 or more in gel permeation chromatography (GPC) measurement.

4. The polyolefin microporous membrane according to claim 1 or 2, wherein a meltdown temperature of the membrane is 150° C. or higher and 200° C. or lower.

5. The polyolefin microporous membrane according to claim 1 or 2, wherein a ratio (MD/TD thermal shrinkage ratio) of a MD thermal shrinkage of the membrane to the TD thermal shrinkage is greater than 1.0 at 120° C. and less than 1.0 at 130° C.

6. The polyolefin microporous membrane according to claim 5, wherein a ratio (MD/TD elastic modulus ratio) of a MD elastic modulus of the membrane to a TD elastic modulus of the membrane is 1.7 or more and 3.0 or less.

7. A method for manufacturing a polyolefin microporous membrane, comprising the steps of:
(A) synthesizing a polyethylene or ethylene constitutional unit-containing copolymer using a monomer and a Ziegler-Natta catalyst to obtain a polyethylene raw material,
(B) molding a polyolefin composition containing the polyethylene raw material into a sheet and stretching the sheet; and
(C) subjecting the sheet to extraction and heat-setting to form a polyolefin microporous membrane having a TD thermal shrinkage at 120° C. of 8% or less, and a TD thermal shrinkage at 130° C. of 3 to 5 times as great as the TD thermal shrinkage at 120° C. and of at least 12% greater than the TD thermal shrinkage at 120° C., wherein the method satisfies at least one of:
(i) in simultaneous biaxial or sequential biaxial stretching in step (B), a ratio (MD/TD strain rate ratio) of a MD strain rate to a TD strain rate is 1.2 or more and 1.8 or less; and
(ii) in the heat setting of step (C), TD stretching and TD relaxation are each included once, a strain rate in the stretching step is 20%/second or more, and a relaxation rate is 10%/second or less.

8. The method for manufacturing the polyolefin microporous membrane according to claim 7, wherein in step (B), a ratio of an extrusion rate Q of the polyolefin composition to a number of screw rotation N of an extruder (Q/N) is 2.0 or more and 7.0 or less.

9. The method for manufacturing the polyolefin microporous membrane according to claim 7 or 8, wherein, in simultaneous biaxial or sequential biaxial stretching in step (B), a ratio (MD/TD strain rate ratio) of a MD strain rate to a TD strain rate is 1.2 or more and 1.8 or less.

10. The method for manufacturing the polyolefin microporous membrane according to claim 7 or 8, wherein in the heat-setting of step (C), TD stretching and TD relaxation are each included once, a strain rate in the stretching step is 20%/second or more, and a relaxation rate is 10%/second or less.

* * * * *